United States Patent
Xie et al.

(10) Patent No.: US 12,124,447 B2
(45) Date of Patent: Oct. 22, 2024

(54) DATA PREFETCHING METHOD AND APPARATUS, ELECTRONIC DEVICE, AND COMPUTER-READABLE STORAGE MEDIUM

(71) Applicant: Baidu Online Network Technology (Beijing) Co., Ltd., Beijing (CN)

(72) Inventors: Da Xie, Beijing (CN); Zhixun Zheng, Beijing (CN); Biao Fan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 663 days.

(21) Appl. No.: 17/275,156

(22) PCT Filed: Aug. 11, 2020

(86) PCT No.: PCT/CN2020/108438
§ 371 (c)(1),
(2) Date: Mar. 10, 2021

(87) PCT Pub. No.: WO2021/139154
PCT Pub. Date: Jul. 15, 2021

(65) Prior Publication Data
US 2021/0319021 A1   Oct. 14, 2021

(30) Foreign Application Priority Data
Jan. 10, 2020   (CN) .......................... 202010024434.0

(51) Int. Cl.
*G06F 16/2453* (2019.01)
*G06F 16/242* (2019.01)
*G06N 20/00* (2019.01)

(52) U.S. Cl.
CPC ...... *G06F 16/24539* (2019.01); *G06F 16/243* (2019.01); *G06N 20/00* (2019.01)

(58) Field of Classification Search
CPC .. G06F 16/24539; G06F 16/243; G06N 20/00
See application file for complete search history.

(56) References Cited

U.S. PATENT DOCUMENTS

| | | | |
|---|---|---|---|
| 6,564,211 B1 * | 5/2003 | Andreev | ............. G06F 16/9027 |
| 6,859,455 B1 * | 2/2005 | Yazdani | ............. G06F 16/90344 |
| | | | 707/E17.042 |

(Continued)

FOREIGN PATENT DOCUMENTS

| | | |
|---|---|---|
| CN | 101639830 A | 2/2010 |
| CN | 102857483 B | 1/2013 |

(Continued)

OTHER PUBLICATIONS

Japanese Office Action for Japanese application No. JP 2021-516412, dated May 20, 2022.

(Continued)

*Primary Examiner* — Mark E Hershley
(74) *Attorney, Agent, or Firm* — Quinn IP Law

(57) ABSTRACT

The present disclosure provides a data prefetching method, a data prefetching apparatus, an electronic device and a computer-readable storage medium. The data prefetching method includes: acquiring a query prefix inputted by a user; analyzing the query prefix in accordance with a pre-trained linguistic model to acquire a perplexity of the query prefix; judging whether the perplexity is smaller than a predetermined threshold; and transmitting a prefetching request in accordance with the query prefix when the perplexity is smaller than the predetermined threshold.

19 Claims, 3 Drawing Sheets

(56) References Cited

U.S. PATENT DOCUMENTS

| | | | |
|---|---|---|---|
| 8,255,411 B1* | 8/2012 | Carpenter | G06F 16/248 707/765 |
| 9,031,970 B1* | 5/2015 | Das | G06F 40/274 707/706 |
| 9,720,955 B1* | 8/2017 | Cao | H04L 51/046 |
| 9,846,836 B2* | 12/2017 | Gao | G06N 3/045 |
| 10,217,058 B2* | 2/2019 | Gamon | G06N 20/00 |
| 10,775,976 B1* | 9/2020 | Abdul-Jawad | G06F 9/54 |
| 10,795,886 B1* | 10/2020 | Samdani | G06F 16/3329 |
| 11,086,858 B1* | 8/2021 | Koukoumidis | H04L 43/0882 |
| 11,238,048 B1* | 2/2022 | Breeden | G06F 16/906 |
| 11,335,346 B1* | 5/2022 | Su | G06F 40/295 |
| 11,663,201 B2* | 5/2023 | Alakuijala | G06F 16/3338 706/12 |
| 2003/0093424 A1* | 5/2003 | Chun | G06F 16/24556 |
| 2006/0206467 A1* | 9/2006 | Jackson | G06F 16/3334 |
| 2007/0088681 A1* | 4/2007 | Aravamudan | G06F 16/252 |
| 2010/0023727 A1* | 1/2010 | Lim | H04L 45/745 711/216 |
| 2010/0189000 A1* | 7/2010 | Hirano | H04L 63/12 370/252 |
| 2013/0041937 A1* | 2/2013 | Zhu | H04L 67/61 709/203 |
| 2015/0178273 A1* | 6/2015 | Hakkani-Tur | G06F 40/40 704/9 |
| 2015/0331619 A1* | 11/2015 | Zheng | G06F 16/2255 711/154 |
| 2015/0347422 A1* | 12/2015 | Fadel | G06F 16/242 707/767 |
| 2015/0379571 A1* | 12/2015 | Grbovic | G06Q 30/0256 705/14.54 |
| 2017/0185581 A1* | 6/2017 | Bojja | G06V 30/19173 |
| 2017/0310616 A1* | 10/2017 | Cao | G06F 16/248 |
| 2018/0082197 A1* | 3/2018 | Aravamudan | G16B 50/10 |
| 2018/0157638 A1* | 6/2018 | Li | G06F 40/35 |
| 2018/0165288 A1* | 6/2018 | Chang | G06N 3/045 |
| 2018/0173692 A1* | 6/2018 | Greenberg | G06F 3/04886 |
| 2018/0285186 A1* | 10/2018 | Godefroid | G06F 11/3604 |
| 2018/0349513 A1* | 12/2018 | Hornkvist | G06F 16/24578 |
| 2018/0357318 A1* | 12/2018 | Chen | G06F 16/9535 |
| 2019/0043201 A1* | 2/2019 | Strong | G06V 10/96 |
| 2019/0278870 A1* | 9/2019 | Novielli | G06N 20/00 |
| 2020/0073882 A1* | 3/2020 | Guggilla | G06N 5/02 |
| 2020/0364508 A1* | 11/2020 | Gurel | G06F 18/214 |
| 2021/0034817 A1* | 2/2021 | Asao | G06N 3/045 |
| 2021/0064925 A1* | 3/2021 | Shih | G06N 3/084 |
| 2021/0073215 A1* | 3/2021 | Srinivasaraghavan | G06F 16/2425 |
| 2021/0073293 A1* | 3/2021 | Fenton | H04L 51/08 |
| 2021/0081459 A1* | 3/2021 | Chung | H04L 51/224 |
| 2021/0174806 A1* | 6/2021 | Krishnaswamy | G10L 15/16 |

FOREIGN PATENT DOCUMENTS

| | | |
|---|---|---|
| CN | 103870492 A | 6/2014 |
| CN | 104156321 B | 11/2014 |
| CN | 108319603 A | 7/2018 |
| CN | 108846016 A | 11/2018 |
| CN | 110222160 A | 9/2019 |
| CN | 111241398 A | 6/2020 |
| JP | 2018206361 A | 12/2018 |
| WO | 2019198386 A1 | 10/2019 |

OTHER PUBLICATIONS

Nakamura et al., "Integration of Multiple LDA Topic Models and Its Application to Predictive Text Entry", Information Processing Society of Japan, vol. 50, No. 4, Apr. 2009, p. 1375-1389.

Takaai et al., "Predictive input system for film reading reports", The 50th Anniversary (72nd) National Convention of the Information Processing Society of Japan, 2010.

Written Opinion of the International searching authority for international application No. PCT/CN2020/108438, issued Nov. 16, 2020.

Wang et al., "A Load balancing Schedule Strategy of Web Server Cluster", 2009.

Chinese Office Action for Chinese Application No. CN202010024434.0, issued Jan. 31, 2023.

The extended European search report for European application No. EP20861984, issued Nov. 15, 2022.

Wenjian et al., "A New Prediction—Based Fetching Model and Level Storage Algorithm for Web Pages", 2014.

CN103870492 (A): An English language Abstract of the foreign language document is provided herewith, which was obtained from Espacenet (http://worldwide.espacenet.com). Additionally, according to the Bibliographic data available on Espacenet (http://worldwide.espacenet.com), this foreign language reference is also published in English, for instance as U.S. Pat. No. 9,377,959 B2.

* cited by examiner

US 12,124,447 B2

DATA PREFETCHING METHOD AND APPARATUS, ELECTRONIC DEVICE, AND COMPUTER-READABLE STORAGE MEDIUM

CROSS-REFERENCE TO RELATED APPLICATION

The present application is the U.S. national phase of PCT Application No. PCT/CN2020/108438 filed on Aug. 11, 2020, which claims a priority of the Chinese patent application 202010024434.0 filed on Jan. 10, 2020, which are incorporated herein by reference in their entirety.

TECHNICAL FIELD

The present disclosure relates to the field of computer technology, in particular to the field of intelligent searching technology.

BACKGROUND

Searching and prefetching function is a prefetching request for a query prefix initiated by a client before a user performs real clicking and searching, and a prefetching result is acquired in advance and presented to the user, so as to increase a searching speed and improve a sense of wonder for the user.

Currently, the prefetching request is mainly issued on the basis of completion and matching of the query prefix inputted by the user. For example, when a query prefix "刘德" is inputted by the user, the query prefix may be completed to "刘德华" and then the prefetching request may be triggered to be issued. Hence, in this mode of issuing the prefetching request on the basis of completion and matching, usually a large quantity of prefetching requests are issued when the query prefix is inputted by the user, but a prefetching success rate is relatively low, thereby system stability may be adversely affected while a machine cost increases.

SUMMARY

An object of the present disclosure is to provide a data prefetching method, a data prefetching apparatus, an electronic device, and a computer-readable storage medium, so as to solve the above-mentioned problem.

In a first aspect, the present disclosure provides in some embodiments a data prefetching method, including: acquiring a query prefix inputted by a user; analyzing the query prefix in accordance with a pre-trained linguistic model to acquire a perplexity of the query prefix; judging whether the perplexity is smaller than a predetermined threshold; and transmitting a prefetching request in accordance with the query prefix when the perplexity is smaller than the predetermined threshold.

In this regard, as compared with a completion and matching mode, when the prefetching requests are transmitted through analyzing the perplexity of the query prefix, it is able to directly filter out the prefetching request with a higher perplexity, thereby to improve a prefetching success rate. In addition, it is able to reduce the machine cost for a backend server caused by the excessive prefetching requests, prevent the system stability from being adversely affected, prevent the user's visual experience from being interfered due to the excessive prefetching results, and improve the user experience.

In some possible embodiments of the present disclosure, when the query prefix includes a special character, the data prefetching method further includes acquiring a correction factor of the perplexity of the query prefix. The judging whether the perplexity is smaller than the predetermined threshold includes: correcting the perplexity using the correction factor of the perplexity; and judging whether a corrected perplexity is smaller than the predetermined threshold. The transmitting the prefetching request in accordance with the query prefix when the perplexity is smaller than the predetermined threshold includes transmitting the prefetching request in accordance with the query prefix when the corrected perplexity is smaller than the predetermined threshold.

In this regard, by means of a correction process, it is able to reduce an influence caused by the special character on the perplexity of the query prefix, thereby to further increase the prefetching success rate.

In some possible embodiments of the present disclosure, the acquiring the correction factor of the perplexity of the query prefix includes calculating the correction factor Re of the perplexity of the query prefix through $$Re = \frac{f}{N}\log_2 count(sw),$$

where N represents a sentence length of the query prefix, count(sw) represents the quantity of special characters in the query prefix, and f represents a predetermined coefficient.

In this regard, it is able to acquire the corresponding correction factor of the perplexity in accordance with the quantity of the special characters, thereby to optimize the perplexity of the query prefix.

In some possible embodiments of the present disclosure, the analyzing the query prefix in accordance with the pre-trained linguistic model to acquire the perplexity of the query prefix includes: slicing the query prefix into a plurality of segmented words; inputting each segmented word into the pre-trained linguistic model to generate word embedding of the segmented word, and determining word embedding of the query prefix in accordance with the word embedding of each segmented word; and inputting the word embedding of the query prefix into the pre-trained linguistic model to acquire the perplexity of the query prefix.

In this regard, it is able to generate the word embedding with stronger Chinese language understanding corresponding to the query prefix by means of the pre-trained linguistic model, and improve the accuracy through analyzing the perplexity of the query prefix in accordance with the word embedding.

In some possible embodiments of the present disclosure, the determining the word embedding of the query prefix in accordance with the word embedding of each segmented word includes concatenating the word embedding of the segmented words to acquire the word embedding of the query prefix.

In some possible embodiments of the present disclosure, subsequent to transmitting the prefetching request in accordance with the query prefix, the data prefetching method further includes receiving a prefetching result corresponding to the query prefix returned by a server in accordance with the prefetching request.

In this regard, it is able to present the acquired prefetching result to the user when the query prefix is inputted by the user, thereby to increase the searching speed.

In a second aspect, the present disclosure provides in some embodiments a data prefetching apparatus, including: a first acquisition module configured to acquire a query prefix inputted by a user; an analysis module configured to analyze the query prefix in accordance with a pre-trained linguistic model to acquire a perplexity of the query prefix; a judgment module configured to judge whether the perplexity is smaller than a predetermined threshold; and a transmission module configured to transmit a prefetching request in accordance with the query prefix when the perplexity is smaller than the predetermined threshold.

In some possible embodiments of the present disclosure, the data prefetching apparatus further includes a second acquisition module configured to acquire a correction factor of the perplexity of the query prefix. The judgment module includes: a correction unit configured to correct the perplexity using the correction factor of the perplexity; and a judgment unit configured to judge whether a corrected perplexity is smaller than the predetermined threshold. The transmission module is further configured to transmit the prefetching request in accordance with the query prefix when the corrected perplexity is smaller than the predetermined threshold.

In some possible embodiments of the present disclosure, the second acquisition module is further configured to calculate the correction factor Re of the perplexity of the query prefix through $$Re = \frac{f}{N}\log_2 \text{count}(sw),$$

where N represents a sentence length of the query prefix, count(sw) represents the quantity of special characters in the query prefix, and f represents a predetermined coefficient.

In some possible embodiments of the present disclosure, the analysis module includes: a slicing unit configured to slice the query prefix into a plurality of segmented words; a generation unit configured to input each segmented word into the pre-trained linguistic model to generate word embedding of the segmented word; a determination unit configured to determine word embedding of the query prefix in accordance with the word embedding of each segmented word; and an analysis unit configured to input the word embedding of the query prefix into the pre-trained linguistic model to acquire the perplexity of the query prefix.

In some possible embodiments of the present disclosure, the determination unit is further configured to concatenate the word embedding of the segmented words to acquire the word embedding of the query prefix.

In some possible embodiments of the present disclosure, the data prefetching apparatus further includes a reception module configured to receive a prefetching result corresponding to the query prefix returned by a server in accordance with the prefetching request.

In a third aspect, the present disclosure provides in some embodiments an electronic device, including at least one processor, and a memory in communication connection with the at least one processor and storing therein an instruction executed by the at least one processor. The instruction is executed by the at least one processor so as to implement the above-mentioned data prefetching method.

In a fourth aspect, the present disclosure provides in some embodiments a non-transitory computer-readable storage medium storing therein a computer instruction. The computer instruction is executed by a computer so as to implement the above-mentioned data prefetching method.

The other effects of the present disclosure will be described hereinafter in conjunction with the embodiments.

BRIEF DESCRIPTION OF THE DRAWINGS

The drawings are provided for understanding the present disclosure in a better manner, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

In order to solve the problem in the related art where a mode of issuing a prefetching request on the basis of completion and matching has a relatively low success rate, the present disclosure provides in some embodiments a data prefetching method. A query prefix inputted by a user is analyzed using a pre-trained linguistic model to acquire a perplexity of the query prefix, and when the perplexity of the query prefix is smaller than a predetermined threshold, the prefetching request maybe transmitted in accordance with the query prefix. Hence, the perplexity of the query prefix may be taken as an important basis for determining whether to issue the prefetching request, so it is able to directly filter out the prefetching request with a high perplexity, thereby to increase a prefetching success rate.

Figure 1:
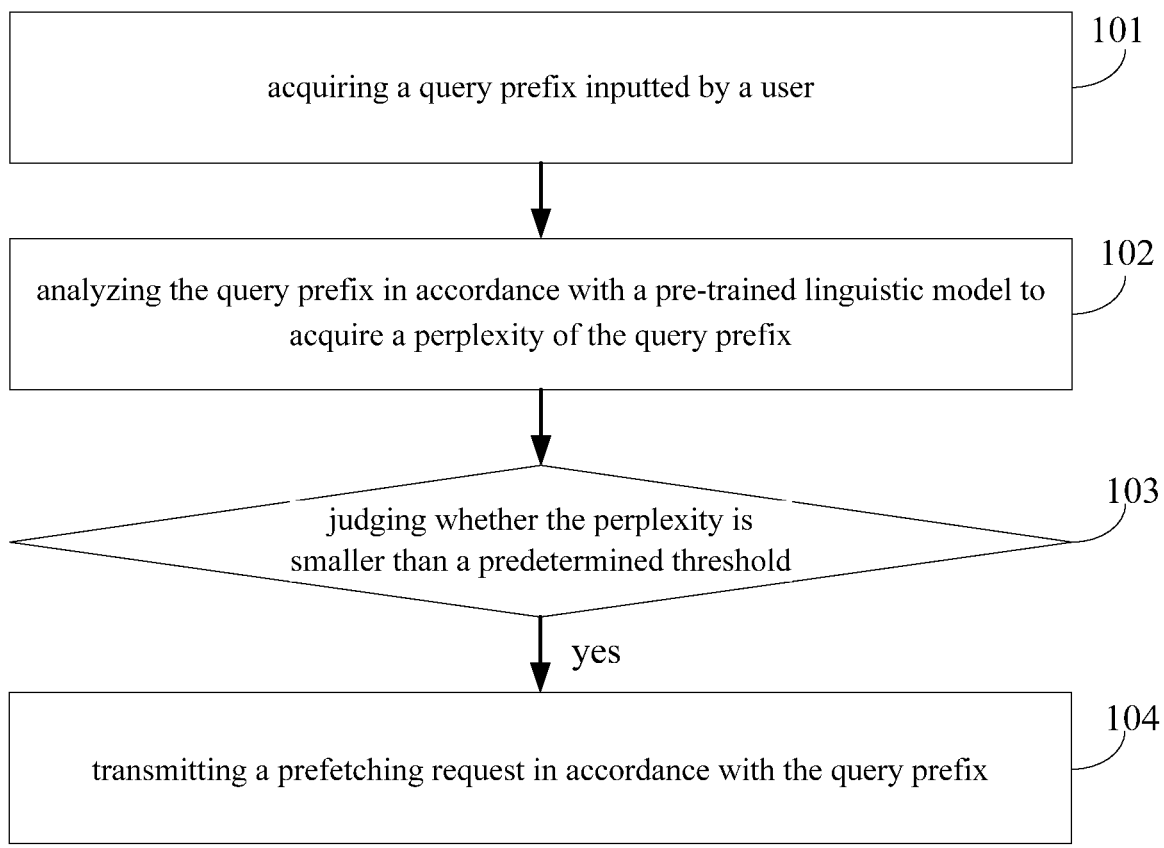
FIG. 1 is a flow chart of a data prefetching method according to one embodiment of the present disclosure.

As shown in FIG. 1, the present disclosure provides in some embodiments a data prefetching method for an electronic device, which includes the following steps.

Step 101: acquiring a query prefix inputted by a user.

In the embodiments of the present disclosure, the query prefix may be inputted by the user in a search box of the electronic device when performing an input operation, and it may be used to present a query content currently inputted by the user. For example, when "刘德华" movies want to be searched, "刘德华" currently inputted by the user may be the query prefix. In one embodiment of the present disclosure, the search box may be a search box of a client application on the electronic device. The client application may be a search application or an application with a searching function, and usually a search box and a search button are provided at a home page of the application. To be specific, after the user has clicked an icon of a corresponding application, the home page of the application may be presented. After the user has clicked the search box, the query prefix may be inputted in the search box.

It should be appreciated that, the electronic device in the embodiments of the present disclosure may be hardware or software. When the electronic device is the hardware, it may be various terminal devices that support web browsing, e.g., it may include, but not limited to, smart phone, tablet computer, e-reader, laptop computer or desktop computer. When the electronic device is the software, it may be installed in the terminal device, and implemented in the form of a plurality of pieces of software or software modules, or in the form of a single piece of software or software module. The electronic device will not be particularly defined herein.

Step 102: analyzing the query prefix in accordance with a pre-trained linguistic model to acquire a perplexity of the query prefix.

In the embodiments of the present disclosure, the pre-trained linguistic model may be any of Recurrent Neural Network (RNN), Long Short-Term Memory (LSTM) network, Gated Recurrent Unit (GRU) network, BiLSTM network, etc. The GRU network is a variant of the LSTM network with an excellent effect, and the BiLSTM network is formed by a forward LSTM network and a backward LSTM network by combination.

It should be appreciated that, in a training procedure of the linguistic model, the training may be performed in a relevant mode and through taking contents of query prefixes inputted in a historical searching process as a training sample, which will not be particularly defined herein. In the specific training procedure, the perplexity (ppl) may be used to judge whether a linguistic model is well or not, and such training platforms as tensorflow, paddle or PyTorch may be used. When the query prefix is evaluated using the pre-trained linguistic model, the ppl may be taken as a quantitative basis for judging whether the query prefix is smooth. Principally, a probability of the occurrence of one sentence may be estimated in accordance with each word, and normalization may be performed in accordance with a sentence length. The ppl may be calculated through $$ppl = \sqrt[N]{\prod_{i=1}^{N} \frac{1}{p(w_i|w_1 w_2 \ldots w_{i-1})}},$$

where N represents a length of the query prefix, $p(w_i)$ represents a probability of an $i^{th}$ word, and $p(w_i|w_1 w_2 \ldots w_{i-1})$ represents the probability of the $i^{th}$ word calculated on the basis of preceding i−1 words. Usually, the smaller the ppl, the lower the perplexity of the query prefix and the higher the smoothness level.

Step 103: judging whether the perplexity is smaller than a predetermined threshold.

In the embodiments of the present disclosure, the predetermined threshold may be set in advance according to the practical need. When the perplexity of the query prefix is smaller than the predetermined threshold, it means that the smoothness level of the query prefix is relatively high, and a prefetching request may be initiated in accordance with the query prefix. When the perplexity of the query prefix is greater than or equal to the predetermined threshold, it means that the perplexity of the query prefix is relatively high and the smoothness level is relatively low. At this time, it makes little sense to initiate the prefetching request in accordance with the query prefix, and the corresponding prefetching request may be directly filtered out.

Step 104: transmitting the prefetching request in accordance with the query prefix when the perplexity is smaller than the predetermined threshold.

In the embodiments of the present disclosure, the transmitting the prefetching request may include transmitting the prefetching request to a server, e.g., a search server, so as to call a search service from the server, thereby to acquire a prefetching result corresponding to the current query prefix.

In a possible embodiment of the present disclosure, subsequent to Step 104, the data prefetching method may further include receiving the prefetching result corresponding to the query prefix returned by the server in accordance with the prefetching request. Further, upon the receipt of the prefetching result, the electronic device may display the prefetching result toward the user, so as to increase a searching speed.

According to the data prefetching method in the embodiments of the present disclosure, when the prefetching requests are transmitted through analyzing the perplexity of the query prefix, it is able to directly filter out the prefetching request with a higher perplexity, thereby to improve a prefetching success rate. In addition, it is able to reduce the machine cost for a backend server caused by the excessive prefetching requests, prevent the system stability from being adversely affected, prevent the user's visual experience from being interfered due to the excessive prefetching results, and improve the user experience.

In actual use, as compared with a mode of issuing the prefetching request on the basis of completion and matching, through the data prefetching mode in the embodiments of the present disclosure, the prefetching success rate may be increased from 26.5% to 45%, so it is able to reduce the amount of issued prefetching flow by 40% without affecting the search speed, and save about 1000 servers.

In the embodiments of the present disclosure, when the query prefix includes a special character, e.g., a punctuation mark, the perplexity of the query prefix may be significantly affected by the special character. In order to reduce the influence caused by the special character, the acquired perplexity may be optimized.

In a possible embodiment of the present disclosure, when the acquired query prefix includes the special character, the data prefetching method may further include acquiring a correction factor of the perplexity of the query prefix. Further, Step 103 may include: correcting the perplexity using the correction factor of the perplexity; and judging whether a corrected perplexity is smaller than the predetermined threshold. Then, the prefetching request may be transmitted in accordance with the query prefix when the corrected perplexity is smaller than the predetermined threshold. In this regard, by means of a correction process, it is able to reduce the influence caused by the special character on the perplexity of the query prefix, thereby to further increase the prefetching success rate.

A relationship between the correction factors of the perplexity and the special characters may be set in advance. In one embodiment of the present disclosure, the correction factor of the perplexity may be associated with whether there is the special character. For example, when the query prefix includes the special character, there may exist a correction factor of the perplexity, e.g., X, and at this time, it is necessary to correct the perplexity of the query prefix using the correction factor X. When the query prefix does not include any special character, there may exist no correction factor of the perplexity, and it is unnecessary to correct the perplexity of the query prefix.

In another possible embodiment of the present disclosure, the correction factor of the perplexity may be associated with the quantity of special characters and a position of each special character. For example, when the correction factor of the perplexity is associated with the quantity of special characters, the correction factor Re of the perplexity of the query prefix may be calculated through $$Re = \frac{f}{N}\log_2 count(sw),$$

where N represents a sentence length of the query prefix (which, for example, may be understood as a string length), count(sw) represents the quantity of special characters in the query prefix, and f represents a predetermined coefficient, e.g., 1.

In this regard, when the perplexity of the query prefix acquired using the pre-trained linguistic model is ppl0 and the corresponding correction factor of the perplexity is Re', the corrected perplexity PPL may be PPL-ppl0+Re'.

In the embodiments of the present disclosure, in order to improve the analysis accuracy of the query prefix, prior to analyzing the query prefix in accordance with the pre-trained linguistic model, the query prefix may be processed to generate corresponding word embedding with stronger Chinese language understanding, and then the perplexity may be analyzed in accordance with the word embedding.

Figure 2:
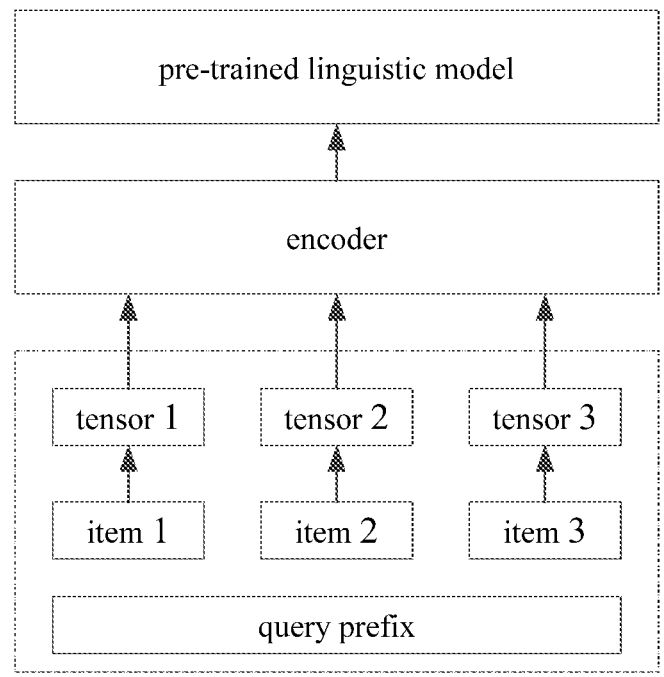
FIG. 2 is a flow chart of a procedure of analyzing a perplexity according to one embodiment of the present disclosure.

In some possible embodiments of the present disclosure, as shown in FIG. 2, Step 102 may include the following steps. At first, the acquired query prefix may be sliced into a plurality of segmented words. The query prefix may be sliced, e.g., in a related segmentation-based mode, so as to acquire item1, item 2, item3, and so on. Next, each segmented word may be inputted to the pre-trained linguistic model to generate word embedding of each segmented word, and word embedding of the query prefix may be determined in accordance with the word embedding of each segmented word. The pre-trained linguistic model may be EMLo, GPT, BERT, XLNet or ERNIE, e.g., tensor1, tensor and tensor3 in FIG. 2. Finally, the word embedding of the query prefix may be inputted to the pre-trained linguistic model to acquire the perplexity of the query prefix. In this regard, through analyzing the perplexity of the query prefix in accordance with the word embedding of the query prefix, it is able to improve the analysis accuracy.

In one possible embodiment of the present disclosure, when determining the word embedding of the query prefix in accordance with the word embedding of each segmented word, the word embedding of the segmented words may be concatenated to acquire the word embedding of the query prefix.

A logic model for issuing the prefetching request will be described hereinafter in conjunction with FIG. 3.

Figure 3:
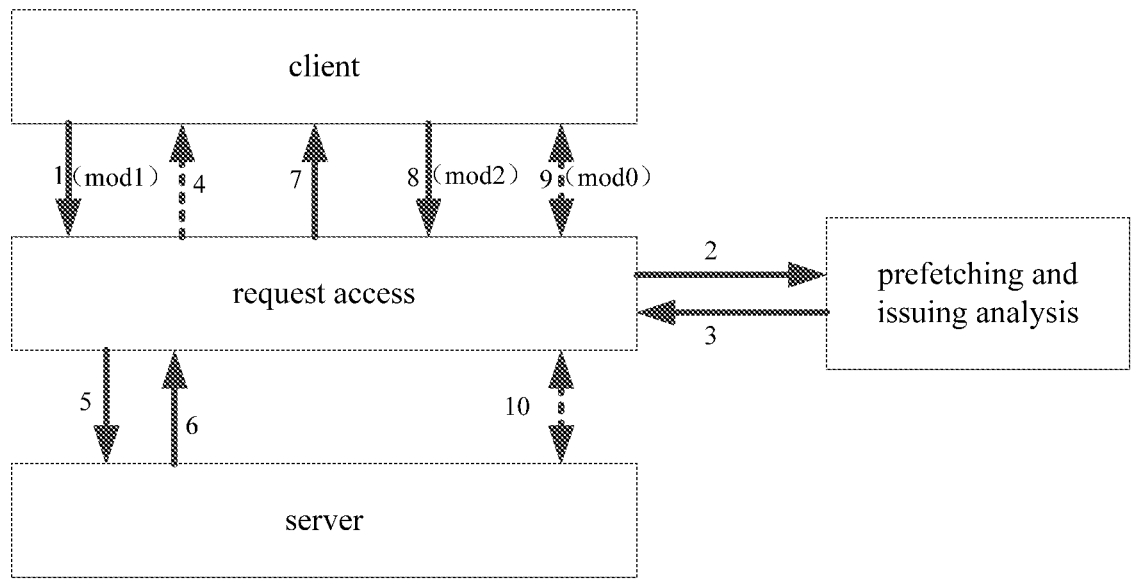
FIG. 3 is a logic block diagram showing the issuing of a prefetching request according to one embodiment of the present disclosure.

As shown in FIG. 3, the logic for issuing the prefetching request may include the following circumstances.

In a first circumstance, 1→2→3→4, where "1 (mod1)" represents that the client is ready for issuing the prefetching request upon the receipt of the query prefix inputted by the user, "2" represents that the query prefix is analyzed in accordance with the pre-trained linguistic model and whether the perplexity is smaller than the predetermined threshold is determined, "3" represents that a determination result is 1, i.e., the perplexity is greater than or equal to the predetermined threshold, and "4" represents that the prefetching request is not to be issued.

In a second circumstance, 1→2→3→5→6→7, where "1 (mod1)" represents that the client is ready for issuing the prefetching request upon the receipt of the query prefix inputted by the user, "2" represents that the query prefix is analyzed in accordance with the pre-trained linguistic model and whether the perplexity is smaller than the predetermined threshold is determined, "3" represents that a determination result is 2, i.e., the perplexity is smaller than the predetermined threshold, "5" represents that the prefetching request is transmitted to the server so as to call a search service from the server; and "6" and "7" represent that the prefetching result is returned by the server.

In a third circumstance, a prefetching process is performed successfully, i.e., "8 (mod2)", which represents that a prefetching success indicator is returned by the client to the server.

In a fourth circumstance, the prefetching process is performed unsuccessfully, i.e., 9→10 (mod0), which represent that a search request is directly initiated by the user after the prefetching process fails.

Figure 4:
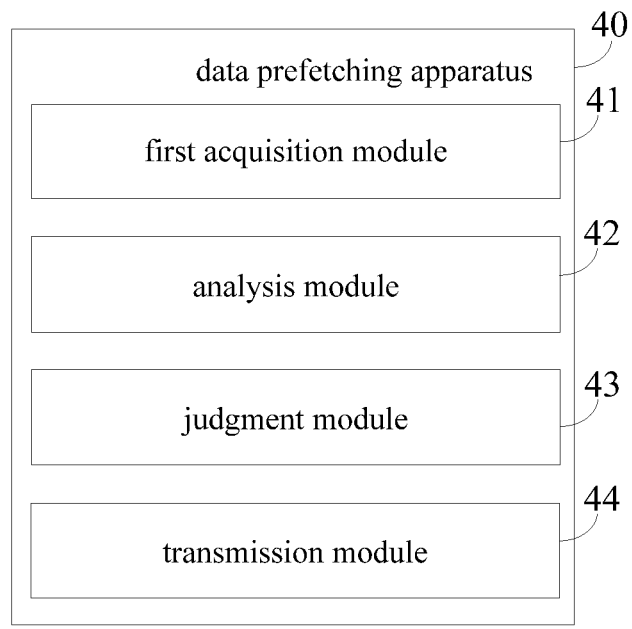
FIG. 4 is a block diagram of a data prefetching apparatus for implementing the data prefetching method according to one embodiment of the present disclosure.

As shown in FIG. 4, the present disclosure further provides in some embodiments a data prefetching apparatus 40 for an electronic device, which includes: a first acquisition module 41 configured to acquire a query prefix inputted by a user; an analysis module 42 configured to analyze the query prefix in accordance with a pre-trained linguistic model to acquire a perplexity of the query prefix; a judgment module 43 configured to judge whether the perplexity is smaller than a predetermined threshold; and a transmission module 44 configured to transmit a prefetching request in accordance with the query prefix when the perplexity is smaller than the predetermined threshold.

In a possible embodiment of the present disclosure, the data prefetching apparatus may further include a second acquisition module configured to acquire a correction factor of the perplexity of the query prefix. The judgment module 43 may include: a correction unit configured to correct the perplexity using the correction factor of the perplexity; and a judgment unit configured to judge whether a corrected perplexity is smaller than the predetermined threshold. The transmission module 44 is further configured to transmit the prefetching request in accordance with the query prefix when the corrected perplexity is smaller than the predetermined threshold.

In a possible embodiment of the present disclosure, the second acquisition module is further configured to calculate the correction factor Re of the perplexity of the query prefix through $$Re = \frac{f}{N}\log_2 count(sw),$$

where N represents a sentence length of the query prefix, count(sw) represents the quantity of special characters in the query prefix, and f represents a predetermined coefficient.

In a possible embodiment of the present disclosure, the analysis module 42 may include: a slicing unit configured to slice the query prefix into a plurality of segmented words; a generation unit configured to input each segmented word into the pre-trained linguistic model to generate word embedding of the segmented word; a determination unit configured to determine word embedding of the query prefix in accordance with the word embedding of each segmented word; and an analysis unit configured to input the word embedding of the query prefix into the pre-trained linguistic model to acquire the perplexity of the query prefix.

In a possible embodiment of the present disclosure, the determination unit is further configured to concatenate the word embedding of the segmented words to acquire the word embedding of the query prefix.

In a possible embodiment of the present disclosure, the data prefetching apparatus may further include a reception module configured to receive a prefetching result corresponding to the query prefix returned by a server in accordance with the prefetching request.

The data prefetching apparatus 40 in the embodiments of the present disclosure may be used to implement the steps of the method in FIG. 1 with a same beneficial effect, which will not be particularly defined herein.

The present disclosure further provides in some embodiments an electronic device and a computer-readable storage medium.

Figure 5:
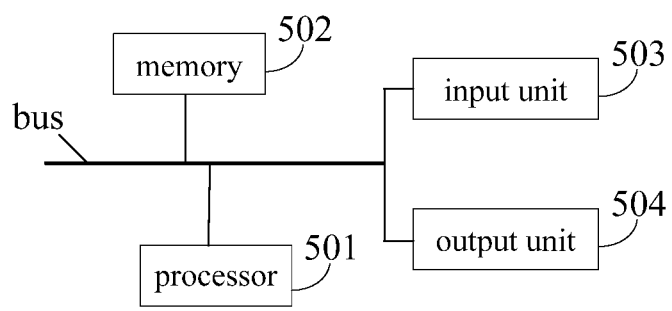
FIG. 5 is a block diagram of an electronic device for implementing the data prefetching method according to one embodiment of the present disclosure.

FIG. 5 is a schematic block diagram of an electronic device for implementing the data prefetching method in the embodiments of the present disclosure. The electronic device is intended to represent all kinds of digital computers, such as a laptop computer, a desktop computer, a work station, a personal digital assistant, a server, a blade server, a main frame or any other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 5, the electronic device includes one or more processors 501, a memory 502, and interfaces for connecting the components, e.g., a high-speed interface and a low-speed interface. The components may be connected to each other via different buses, and installed on a common motherboard or installed in any other form according to the practical need. The processor is configured to process instructions to be executed within the electronic device, including an instruction stored in the memory or an instruction stored in the memory for displaying Graphical User Interface (GUI) information on an external input/output device (e.g., a display device coupled to an interface). In some other embodiments of the present disclosure, if necessary, the plurality of processors and/or buses may be used together with a plurality of memories. Identically, a plurality of electronic devices may be provided, and each electronic device may be used to perform a part of necessary operations (e.g., as a server array, a group of blade servers, or a multi-processor system). In FIG. 5, one processor 501 is shown as an example.

The memory 502 may be just the non-transitory computer-readable storage medium in the embodiments of the present disclosure. Instructions capable of being executed by at least one processor may be stored in the memory, so as to enable the at least one processor to implement the data prefetching method in the embodiments of the present disclosure. The non-transitory computer-readable storage medium may store therein a computer program, and the computer program is executed by a computer so as to implement the data prefetching method.

As a non-transitory computer-readable storage medium, the memory 502 may store therein a non-transitory software program, a non-transitory computer-executable program and a module, e.g., program instructions/modules corresponding to the data prefetching method (e.g., the first acquisition module 41, the analysis module 42, the judgment module 43 and the transmission module 44 in FIG. 4). The processor 501 is configured to execute the non-transitory software program, instruction and module in the memory 502, so as to execute various function applications in the server as well as data processing, i.e., to implement the above-mentioned data prefetching method.

The memory 502 may include an application storage area and a data storage area. An operating system and at least one application for the functions may be stored in the application storage area. Data created in accordance with the operation of the electronic device may be stored in the data storage area. In addition, the memory 502 may include a high-speed random access memory, or a non-transitory memory, e.g., at least one magnetic disk, a flash memory, or any other non-transitory solid-state memory. In some embodiments of the present disclosure, the memory 502 may optionally include memories arranged remotely relative to the processor 501, and these remote memories may be connected to the electronic device for implementing the method for retrieving the multimedia content via a network. Examples of the network may include, but not limited to, Internet, Intranet, local area network or mobile communication network, or a combination thereof.

The electronic device for implementing the data prefetching method may further include an input unit 503 and an output unit 504. The processor 501, the memory 502, the input unit 503 and the output unit 504 may be connected to each other via a bus or the like. In FIG. 5, they are connected to each other via a bus.

The input unit 503 may receive digital or character information, and generate a key signal input related to user settings and function control of the electronic device for implementing the data prefetching method, e.g., touch panel, keypad, mouse, trackpad, touchpad, indication rod, one or more mouse buttons, track ball, or joystick. The output unit 504 may include a display device, an auxiliary lighting device (e.g., light-emitting diode (LED)) or a haptic feedback device (e.g., vibration motor). The display device may include, but not limited to, a liquid crystal display (LCD), an LED display or a plasma display. In some embodiments of the present disclosure, the display device may be a touch panel.

Various implementations of the aforementioned systems and techniques may be implemented in a digital electronic circuit system, an integrated circuit system, an application-specific integrated circuit (ASIC), hardware, firmware, software, or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

These computer programs (also called as programs, software, software application or codes) may include machine instructions for the programmable processor, and they may be implemented using an advanced process and/or an object oriented programming language, and/or an assembly/machine language. The terms "machine-readable medium" and "computer-readable medium" used in the context may refer to any computer program products, devices and/or devices (e.g., magnetic disc, optical disc, memory or programmable logic device (PLD)) capable of providing the machine instructions and/or data to the programmable processor, including a machine-readable medium that receives a machine instruction as a machine-readable signal. The term "machine-readable signal" may refer to any signal through which the machine instructions and/or data are provided to the programmable processor.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other.

According to the embodiments of the present disclosure, it is able to directly filter out the prefetching request with a high perplexity, thereby to improve a prefetching success rate. In addition, it is able to reduce the machine cost for a backend server caused by the excessive prefetching requests, prevent the system stability from being adversely affected, prevent the user's visual experience from being interfered due to the excessive prefetching results, and improve the user experience.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A data prefetching method realized by a computer, applied to a client application with a search box, the method comprising:
    acquiring a query prefix inputted by a user through the search box, wherein the query prefix is inputted by a user in the search box appeared on a display of the computer when performing an input operation, and the query prefix is used to present a query content currently inputted by the user and the meaning of the query prefix is incomplete;
    analyzing the query prefix in accordance with a pre-trained linguistic model to acquire a perplexity of the query prefix, wherein the perplexity is used to determine smoothness level of the query prefix in terms of constituting a complete meaning by the query prefix;
    judging whether the perplexity is smaller than a predetermined threshold;
    transmitting a prefetching request in accordance with the query prefix when the perplexity is smaller than the predetermined threshold, and
    obtaining a query search result corresponding to the query prefix with its perplexity being smaller than the predetermined threshold,
    wherein the smaller the perplexity of the query prefix is, the higher a smoothness level of the query prefix is.

2. The data prefetching method according to claim 1, wherein when the query prefix comprises a punctuation mark,
    wherein the data prefetching method further comprises: acquiring a correction factor of the perplexity of the query prefix,
    wherein the judging whether the perplexity is smaller than the predetermined threshold comprises: correcting the perplexity using the correction factor of the perplexity; and judging whether a corrected perplexity is smaller than the predetermined threshold,
    wherein the transmitting the prefetching request in accordance with the query prefix when the perplexity is smaller than the predetermined threshold comprises: transmitting the prefetching request in accordance with the query prefix when the corrected perplexity is smaller than the predetermined threshold.

3. The data prefetching method according to claim 2, wherein the acquiring the correction factor of the perplexity of the query prefix comprises:
calculating the correction factor Re of the perplexity of the query prefix through $$Re = \frac{f}{N}\log_2 \text{count}(sw),$$

where N represents a sentence length of the query prefix, count(sw) represents the quantity of punctuation marks in the query prefix, and f represents a predetermined coefficient.

4. The data prefetching method according to claim 1, wherein the analyzing the query prefix in accordance with the pre-trained linguistic model to acquire the perplexity of the query prefix comprises:
slicing the query prefix into a plurality of segmented words;
inputting each segmented word into the pre-trained linguistic model to generate word embedding of the segmented word, and determining word embedding of the query prefix in accordance with the word embedding of each segmented word; and
inputting the word embedding of the query prefix into the pre-trained linguistic model to acquire the perplexity of the query prefix.

5. The data prefetching method according to claim 4, wherein the determining the word embedding of the query prefix in accordance with the word embedding of each segmented word comprises:
concatenating the word embedding of the segmented words to acquire the word embedding of the query prefix.

6. The data prefetching method according to claim 1, wherein subsequent to transmitting the prefetching request in accordance with the query prefix, the data prefetching method further comprises:
receiving a prefetching result corresponding to the query prefix returned by a server in accordance with the prefetching request.

7. The method according to claim 1, wherein the query prefix is inputted by a user in a search box appeared on a display of the computer when performing an input operation, and the query prefix is used to present a query content currently inputted by the user.

8. An electronic device, comprising at least one processor, and a memory in communication connection with the at least one processor and storing therein an instruction executed by the at least one processor, wherein the instruction is executed by the at least one processor so as to implement operations realized by a computer, applied to a client application with a search box, the operations comprising:
acquiring a query prefix inputted by a user through the search box, wherein the query prefix is inputted by a user in the search box appeared on a display of the computer when performing an input operation, and the query prefix is used to present a query content currently inputted by the user and the meaning of the query prefix is incomplete;
analyzing the query prefix in accordance with a pre-trained linguistic model to acquire a perplexity of the query prefix, wherein the perplexity is used to determine smoothness level of the query prefix in terms of constituting a complete meaning by the query prefix;
judging whether the perplexity is smaller than a predetermined threshold;
transmitting a prefetching request in accordance with the query prefix when the perplexity is smaller than the predetermined threshold, and
obtaining a query search result corresponding to the query prefix with its perplexity being smaller than the predetermined threshold,
wherein the smaller the perplexity of the query prefix is, the higher a smoothness level of the query prefix is.

9. The electronic device according to claim 8, wherein when the query prefix comprises a punctuation mark,
wherein the data prefetching method further comprises:
acquiring a correction factor of the perplexity of the query prefix,
wherein the judging whether the perplexity is smaller than the predetermined threshold comprises: correcting the perplexity using the correction factor of the perplexity; and judging whether a corrected perplexity is smaller than the predetermined threshold,
wherein the transmitting the prefetching request in accordance with the query prefix when the perplexity is smaller than the predetermined threshold comprises: transmitting the prefetching request in accordance with the query prefix when the corrected perplexity is smaller than the predetermined threshold.

10. The electronic device according to claim 9, wherein the acquiring the correction factor of the perplexity of the query prefix comprises:
calculating the correction factor Re of the perplexity of the query prefix through $$Re = \frac{f}{N}\log_2 \text{count}(sw),$$

where N represents a sentence length of the query prefix, count(sw) represents the quantity of punctuation marks in the query prefix, and f represents a predetermined coefficient.

11. The electronic device according to claim 8, wherein the analyzing the query prefix in accordance with the pre-trained linguistic model to acquire the perplexity of the query prefix comprises:
slicing the query prefix into a plurality of segmented words;
inputting each segmented word into the pre-trained linguistic model to generate word embedding of the segmented word, and determining word embedding of the query prefix in accordance with the word embedding of each segmented word; and
inputting the word embedding of the query prefix into the pre-trained linguistic model to acquire the perplexity of the query prefix.

12. The electronic device according to claim 11, wherein the determining the word embedding of the query prefix in accordance with the word embedding of each segmented word comprises:
concatenating the word embedding of the segmented words to acquire the word embedding of the query prefix.

13. The electronic device according to claim 8, wherein subsequent to transmitting the prefetching request in accordance with the query prefix, the data prefetching method further comprises:

receiving a prefetching result corresponding to the query prefix returned by a server in accordance with the prefetching request.

14. A non-transitory computer-readable storage medium storing therein a computer instruction, wherein the computer program is executed by a computer to implement operations realized by the computer, applied to a client application with a search box, the operations comprising:
  acquiring a query prefix inputted by a user through the search box, wherein the query prefix is inputted by a user in the search box appeared on a display of the computer when performing an input operation, and the query prefix is used to present a query content currently inputted by the user and the meaning of the query prefix is incomplete;
  analyzing the query prefix in accordance with a pre-trained linguistic model to acquire a perplexity of the query prefix, wherein the perplexity is used to determine smoothness level of the query prefix in terms of constituting a complete meaning by the query prefix;
  judging whether the perplexity is smaller than a predetermined threshold;
  transmitting a prefetching request in accordance with the query prefix when the perplexity is smaller than the predetermined threshold, and
  obtaining a query search result corresponding to the query prefix with its perplexity being smaller than the predetermined threshold,
  wherein the smaller the perplexity of the query prefix is, the higher a smoothness level of the query prefix is.

15. The non-transitory computer-readable storage medium according to claim 14, wherein when the query prefix comprises a punctuation mark,
  wherein the data prefetching method further comprises: acquiring a correction factor of the perplexity of the query prefix,
  wherein the judging whether the perplexity is smaller than the predetermined threshold comprises: correcting the perplexity using the correction factor of the perplexity; and judging whether a corrected perplexity is smaller than the predetermined threshold,
  wherein the transmitting the prefetching request in accordance with the query prefix when the perplexity is smaller than the predetermined threshold comprises: transmitting the prefetching request in accordance with the query prefix when the corrected perplexity is smaller than the predetermined threshold.

16. The non-transitory computer-readable storage medium according to claim 15, wherein the acquiring the correction factor of the perplexity of the query prefix comprises:
  calculating the correction factor Re of the perplexity of the query prefix through $$Re = \frac{f}{N}\log_2 \text{count}(sw),$$

where N represents a sentence length of the query prefix, count(sw) represents the quantity of punctuation marks in the query prefix, and f represents a predetermined coefficient.

17. The non-transitory computer-readable storage medium according to claim 14, wherein the analyzing the query prefix in accordance with the pre-trained linguistic model to acquire the perplexity of the query prefix comprises:
  slicing the query prefix into a plurality of segmented words;
  inputting each segmented word into the pre-trained linguistic model to generate word embedding of the segmented word, and determining word embedding of the query prefix in accordance with the word embedding of each segmented word; and
  inputting the word embedding of the query prefix into the pre-trained linguistic model to acquire the perplexity of the query prefix.

18. The non-transitory computer-readable storage medium according to claim 17, wherein the determining the word embedding of the query prefix in accordance with the word embedding of each segmented word comprises:
  concatenating the word embedding of the segmented words to acquire the word embedding of the query prefix.

19. The non-transitory computer-readable storage medium according to claim 14, wherein subsequent to transmitting the prefetching request in accordance with the query prefix, the data prefetching method further comprises:
  receiving a prefetching result corresponding to the query prefix returned by a server in accordance with the prefetching request.

* * * * *